(12) United States Patent
Hauville (10) Patent No.: US 7,563,301 B2
(45) Date of Patent: Jul. 21, 2009

(54) AIR FILTER WITH PARTIAL-DEPTH, OPEN-CELL STABILIZER TO REDUCE DETRIMENTAL SHIFTING AND SETTLING OF GRANULAR FILTER MATERIALS WITHIN THE FILTER

(75) Inventor: Francois Hauville, North Andover, MA (US)

(73) Assignee: FIPAK Research and Development Company, Rowley, MA (US)

( * ) Notice: Subject to any disclaimer, the term of this patent is extended or adjusted under 35 U.S.C. 154(b) by 288 days.

(21) Appl. No.: 11/602,890

(22) Filed: Nov. 21, 2006

(65) Prior Publication Data

US 2008/0115670 A1    May 22, 2008

(51) Int. Cl.
*B01D 46/30* (2006.01)
*B01D 39/06* (2006.01)

(52) U.S. Cl. .............................. 55/518; 55/513; 55/516; 96/152; 210/503

(58) Field of Classification Search .................... 55/475, 55/484, 512, 513, 516, 517, 518, 519; 96/137, 96/149, 151, 152, 154; 210/503
See application file for complete search history.

(56) References Cited

U.S. PATENT DOCUMENTS

| | | | | |
|---|---|---|---|---|
| 2,764,251 A * | 9/1956 | Jessop | ........................ | 96/137 |
| 3,330,101 A * | 7/1967 | Murphy, Jr. | ................... | 55/484 |
| 3,344,590 A * | 10/1967 | Smith et al. | .................... | 55/484 |
| 3,354,623 A * | 11/1967 | Keller | ........................ | 55/484 |
| 3,411,273 A * | 11/1968 | Duncan et al. | ................ | 96/129 |
| 3,590,561 A * | 7/1971 | Marble | ......................... | 55/484 |
| 3,630,007 A * | 12/1971 | Neumann | ..................... | 96/129 |
| 3,675,394 A * | 7/1972 | Sterrett | ......................... | 96/133 |
| 3,747,300 A * | 7/1973 | Knudson | ........................ | 96/58 |
| 4,227,904 A * | 10/1980 | Kasmark et al. | .............. | 96/139 |
| 5,733,350 A * | 3/1998 | Muller et al. | .................. | 55/482 |
| 5,746,914 A | 5/1998 | Hanna et al. | | |
| 5,964,927 A * | 10/1999 | Graham et al. | ................ | 96/121 |
| 6,039,780 A * | 3/2000 | Hummel et al. | ............... | 55/502 |
| 6,113,674 A * | 9/2000 | Graham et al. | ................ | 95/148 |
| 6,533,847 B2 * | 3/2003 | Seguin et al. | ................. | 96/129 |
| 6,758,885 B2 * | 7/2004 | Leffel et al. | .................... | 96/134 |
| 7,276,042 B2 * | 10/2007 | Polaschegg et al. | ........ | 604/6.09 |
| 7,419,526 B2 * | 9/2008 | Greer et al. | .................... | 55/512 |

FOREIGN PATENT DOCUMENTS

DE    195 48 180    7/1997
GB    2 324 051    10/1998

\* cited by examiner

*Primary Examiner*—Duane S Smith
*Assistant Examiner*—Robert A Clemente
(74) *Attorney, Agent, or Firm*—Pandiscio & Pandiscio (57) ABSTRACT

A filter comprising a hollow frame comprising a first face, a second face and an interior passageway extending therebetween; a first screen extending across the passageway at the first face; a first partial-depth, open-cell stabilizer extending across and into the passageway, wherein the stabilizer comprises a matrix formed by a plurality of walls defining a plurality of open cells therebetween, a second screen extending across the passageway at the second face; a second partial-depth, open-cell stabilizer extending across and into the passageway, wherein the stabilizer comprises a matrix formed by a plurality of walls defining a plurality of open cells therebetween; and granular filter materials tightly packed within the passageway, between the first screen and the second screen.

19 Claims, 5 Drawing Sheets

AIR FILTER WITH PARTIAL-DEPTH, OPEN-CELL STABILIZER TO REDUCE DETRIMENTAL SHIFTING AND SETTLING OF GRANULAR FILTER MATERIALS WITHIN THE FILTER

FIELD OF THE INVENTION

This invention relates to air filters in general, and more particularly to air filters of the sort which use granular filter materials to filter air passing through the filter.

BACKGROUND OF THE INVENTION

Air filters frequently use granular filter materials to filter air passing through the filter and thereby remove unwanted substances from the air. By way of example, many air filters use activated carbon granules to purge unwanted substances (e.g., toxins, biomolecules, etc.) from the air. Typically, the granular filter materials are disposed in a frame, between two screens (e.g., meshes, grills, etc.) which pass air but retain the granular filter materials.

The granular filter materials typically have an irregular shape which can complicate close packing. More particularly, during shipping and handling of the filter, the granular filter materials tend to shift and settle, which can result in the creation of preferential passageways through the filter materials.

Furthermore, as the granular filter materials shift within the filter, larger granules can break down into smaller granules, which can in turn lead to further shifting and settling, thereby leading to additional granule breakdown, etc. This problem is particularly acute where the granular filter materials are relatively brittle and hence susceptible to breakage. As the granular filter materials break down into smaller and smaller particles, the tendency to create preferential passageways increases.

The aforementioned preferential passageways through the granular filter materials (which are sometimes referred to as "chimneys") are generally undesirable, since they permit the air to pass through the filter with reduced exposure to the filter materials, thereby reducing the effectiveness of the filter. This shifting and settling effect is particularly troublesome in the case of activated carbon granules and the like, since these granules tend to be irregularly shaped and hence highly susceptible to the aforementioned detrimental shifting and settling during shipping and handling.

As a result, it is common for granular filter manufacturers, and in particular activated carbon filter manufacturers, to use various means to reduce detrimental shifting and settling of the granular filter materials within the filter, e.g., shifting and settling during shipping and handling. Such filter material stabilizing means are well known in the industry, and include (i) the use of compression springs and elastic foam to compress the granular filter materials between the two opposing screens, whereby to reduce detrimental shifting and settling of the granular filter materials; (ii) cross-bracing the frame (i.e., across the depth of the filter) so as to subdivide the granular filter materials into smaller, independent domains, whereby to reduce shifting and settling of the granular filter materials during shipping and handling; (iii) limiting the size (i.e., the cross-sectional area) of each filter, and using more individual filters, to provide a given level of filtration (i.e., to provide a given cross-sectional filtration area); etc.

While these approaches have been found to generally reduce the formation of preferential passageways within the granular filter materials and thereby increase the effectiveness of the filter, such constructions are generally more complex to manufacture and hence increase the overall cost of the filter. In addition, while the use of cross-bracing can help to reduce shifting and settling of the granular filter materials by subdividing the granular filter materials into smaller, independent domains, it also tends to increase the number of filter granules which are positioned alongside a wall of the cross-bracing. This presents a new problem, since the irregularly-shaped granules tend to pack poorly alongside the walls of the cross-bracing, thereby leading to the creation of "wall chimneys" (i.e., chimneys running the depth of the filter, alongside the walls of the cross-bracing). Inasmuch as the cross-bracing walls extend through the full depth of the filter, these "wall chimneys" create substantial new preferential passageways extending through the depth of the filter and thus reduce the overall effectiveness of the filter.

Accordingly, there is a need for a new and improved filter construction which provides means for reducing detrimental shifting and settling of the granular filter materials during shipping and handling, while minimizing the complexity, cost and wall chimney problems encountered by the prior art.

SUMMARY OF THE INVENTION

These and other objects are addressed by the present invention, which comprises the provision and use of a novel air filter comprising:

a hollow frame comprising a first face, a second face and an interior passageway extending therebetween;

a first screen extending across the passageway at the first face;

a first partial-depth, open-cell stabilizer extending across and into the passageway, wherein the stabilizer comprises a matrix formed by a plurality of walls defining a plurality of open cells therebetween, a second screen extending across the passageway at the second face;

a second partial-depth, open-cell stabilizer extending across and into the passageway, wherein the stabilizer comprises a matrix formed by a plurality of walls defining a plurality of open cells therebetween; and granular filter materials tightly packed within the passageway, between the first screen and the second screen;

wherein the distance between the first screen and the second screen defines the depth of the filter;

wherein the aggregate depth of the first partial-depth, open-cell stabilizer and the second partial-depth, open-cell stabilizer are collectively less than the depth of the filter; and wherein the depths of the first and second partial-depth, open-cell stabilizers, the number, size and cross-section of their open cells, the depth of the filter, the composition of the granular filter materials, and the tightness of packing of the granular filter materials, are all balanced vis-à-vis one another in order to provide improved stabilization for the granular filter materials without creating excessive wall chimney effects.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Looking first at FIGS. 1-5, there is shown a filter 5 formed in accordance with the present invention. Filter 5 generally comprises a hollow frame 10 generally characterized by a first face 15, a second face 20 and an interior passageway 25 extending therebetween. Frame 10 preferably comprises a first half 30 and a second half 35 which are joined together at a joint 40 so as to simplify filter manufacture, although other constructions may also be used.

A first screen 45 extends across passageway 25 at first face 15, a second screen 50 extends across passageway 25 at second face 20, and granular filter materials 55 are disposed within the passageway 25, between first screen 45 and second screen 50. For the purposes of the present invention, the distance between first screen 45 and second screen 50, and hence the depth of granular filter materials 55, can be considered to be the "depth" of the filter.

In accordance with the present invention, a first partial-depth, open-cell stabilizer 60 is formed as part of first screen 45 and extends part way into passageway 25 (and hence part way into the depth of granular filter materials 55), and a second partial-depth, open-cell stabilizer 65 is formed as part of second screen 50 and extends part way into passageway 25 (and hence part way into the depth of granular filter materials 55). The aggregate depths of first partial-depth, open-cell stabilizer 60 and second partial-depth, open-cell stabilizer 65 are, collectively, less than the overall depth of the filter. However, by virtue of the fact that (i) first partial-depth, open-cell stabilizer 60 and second partial-depth, open-cell stabilizer 65 each extend part way into passageway 25, and (ii) the granular filter materials 55 are held in compression between first screen 45 and second screen 50, first partial-depth, open-cell stabilizer 60 and second partial-depth, open-cell stabilizer 65 are together capable of stabilizing substantially the entire mass of granular filter materials 55, even though they collectively extend through only a portion of the complete depth of the filter.

More particulary, as first partial-depth, open-cell stabilizer 60 and second partial-depth, open-cell stabilizer 65 extend into the mass of the compressed granular filter materials 55, they each stabilize the "first ranks" of the granules which are disposed within the open cells (see below) of the stabilizers 60, 65. Inasmuch as the granular filter materials 55 are tightly packed between first screen 45 and second screen 50, these stabilized "first ranks" of granules in turn stabilize their immediately-adjacent, or "second", ranks of granules; and this effect cascades throughout the entire depth of the interlocked mass of the granular filter materials. Thus, the mass of granular filter materials 55 are substantially fully stabilized within the filter, even though the first partial-depth, open-cell stabilizer 60 and second partial-depth, open-cell stabilizer 65 extend through only a portion of the full depth of the filter.

As a result of the foregoing construction, first partial-depth, open-cell stabilizer 60 and second partial-depth, open-cell stabilizer 65 are able to significantly reduce, and preferably substantially eliminate, detrimental shifting and settling of the granular filter materials 55 during shipping and handling of the filter, without creating significant preferential passageways through the granular filter materials. This is a significant advance over the prior art.

First screen 45 is secured to frame 10; and second screen 50 is secured to frame 10 Similarly, first partial-depth, open-cell stabilizer 60 is secured to frame 10, and preferably also to first screen 45; and second partial-depth, open-cell stabilizer 65 is secured to frame 10, and preferably also to second screen 50. In one preferred form of the invention, first screen 45 and first partial-depth, open-cell stabilizer 60 are formed, together with first half 30 of frame 10, as a singular construction, e.g., by molding them as a single piece, or by molding them as separate pieces and thereafter ultrasonically welding or gluing them together; and second screen. 50 and second partial-depth, open-cell stabilizer 65 are formed, together with second half 35 of frame 10, as a singular construction, e.g., by molding them as a single piece, or by molding them as separate pieces and thereafter ultrasonically welding or gluing them together. In any case, however, first screen 45, second screen 50, first partial-depth, open-cell stabilizer 60 and second partial-depth, open-cell stabilizer 65 are fixed in position relative to frame 10.

Frame 10 provides an overall structure for the filter. Frame 10 is shown in the figures as having a rectangular parallelopiped (e.g. box-like) shape, although the present invention may be applied to other filter shapes as well, e.g. to filters having a disc-like shape, etc. Frame 10 may be formed out of any suitable materials consistent with the present invention, e.g., metal, plastic, ceramic, etc.

First screen 45 and second screen 50 comprise mesh or grill-like structures having small openings formed therein. More particularly, first screen 45 and second screen 50 are formed so that they are capable of retaining granular filter materials 55 therebetween, while still permitting the passage of air therethrough. First screen 45 and second screen 50 may be formed out of any suitable materials consistent with the present invention (e.g., metal, plastic, etc.), and may have a regular pattern (e.g., grid-like, in a manner similar to that of a conventional window screen), or no regular pattern (e.g., in a manner similar to that of batting, steel wool, etc.). The specific size of the openings present in first screen 45 and second screen 50 may vary according to the filter characteristics (e.g., they may be larger where granular filter materials 55 are of a larger granule size, and they may be smaller where granular filter materials 55 are of a smaller size). Preferably, the openings within first screen 45 and second screen 50 are less than 3 mm. By way of example but not limitation, in one preferred form of the present invention, the openings within first screen 45 and second screen 50 are approximately 0.5 mm in size.

Preferably, first screen 45 and second screen 50 are identical to one another.

In order to provide stability to the granular filter materials 55, first partial-depth, open-cell stabilizer 60 extends from first screen 45 into granular filter materials 55, and second partial-depth, open-cell stabilizer 65 extends from second screen 50 into granular filter materials 55. Where first partial-depth, open-cell stabilizer 60 is formed integral with first screen 45, first partial-depth, open-cell stabilizer 60 also helps support first screen 45; and where second partial-depth, open-cell stabilizer 65 is formed integral with second screen 50, second open-cell stabilizer 65 also helps support second screen 50.

Still looking now at FIGS. 1-5, first partial-depth, open-cell stabilizer 60 extends across passageway 25 at first screen 45. First partial-depth, open-cell stabilizer 60 comprises a matrix formed by a plurality of walls 70 defining a plurality of open cells 75 therebetween. First partial-depth, open-cell stabilizer 60 essentially comprises a honeycomb structure. The particular number, size and cross-section of open cells 75 may vary according to the filter characteristics (e.g., filter size, the granular filter materials used, etc.). Walls 70 of first partial-depth, open-cell stabilizer 60 extend a distance into granular filter materials 55; however, walls 70 do not extend completely across the depth of the filter. More particularly, walls 70 of first partial-depth, open-cell stabilizer 60 extend sufficiently far into granular filter materials 55 as to stabilize "first ranks" of the compressed granules, which in turn stabilize adjacent ranks of the compressed granules, with the foregoing effect cascading through the depth of the compressed, interlocked granules, whereby to significantly reduce detrimental shifting and settling of the granular filter materials throughout the depth of the filter. However, walls 70 do not extend far enough across granular filter materials 55 as to produce significant wall chimneys, thereby avoiding the creation of significant preferential passageways which could undermine the effectiveness of the filter. By way of example but not limitation, walls 70 may extend across approximately 5-30% of the depth of the filter.

Second partial-depth, open-cell stabilizer 65 extends across passageway 25 at second screen 50. Second partial-depth, open-cell stabilizer 65 comprises a matrix formed by a plurality of walls 80 defining a plurality of open cells 85 therebetween. Second partial-depth, open-cell stabilizer 65 essentially comprises a honeycomb structure. The particular number, size and cross-section of open cells 85 may vary according to the filter characteristics (e.g., filter size, the granular filter materials used, etc.). Walls 80 of second partial-depth, open-cell stabilizer 65 extend a distance into granular filter materials 55; however, walls 80 do not extend completely across the depth of the filter. More particularly, walls 80 of second partial-depth, open-cell stabilizer 65 extend sufficiently far into granular filter materials 55 as to stabilize "first ranks" of the compressed granules, which in turn stabilize adjacent ranks of the compressed granules, with the foregoing effect cascading through the depth of the compressed, interlocked granules, whereby to significantly reduce detrimental shifting and settling of the granular filter materials throughout the depth of the filter. However, walls 80 do not extend far enough across granular filter materials 55 as to produce significant wall chimneys, thereby avoiding the creation of significant preferential passageways which could undermine the effectiveness of the filter. By way of example but not limitation, walls 80 may extend across approximately 5-30% of the depth of the filter.

Preferably, first partial-depth, open-cell stabilizer 60 and second partial-depth, open-cell stabilizer 65 are formed identical to one another.

It should be appreciated that as the overall depth of the frame increases, the depth of each partial-depth, open-cell stabilizer may increase as well. However, the depth of each partial-depth, open-cell stabilizer 60, 65 will still constitute only a fraction of the total depth of the filter. By way of example but not limitation, in one preferred form of the present invention, where the overall depth of the filter frame is 40 mm, each partial-depth, open-cell stabilizer may have a thickness of approximately 4 mm.

In any case, the aggregate depths of first partial-depth, open-cell stabilizer 60 and second partial-depth, open-cell stabilizer 65 are, collectively, less than the overall depth of the filter. Nonetheless, even though first partial-depth, open-cell stabilizer 60 and second partial-depth, open-cell stabilizer 65 collectively extend less than the full depth of the filter, they are capable of together stabilizing substantially the entire mass of granular filter materials 55. This is because as first partial-depth, open-cell stabilizer 60 and second partial-depth, open-cell stabilizer 65 extend into the mass of the granular filter materials 55, they each stabilize the "first ranks" of the granules which are disposed within the open cells 75, 85 of the stabilizers 60, 65. Inasmuch as the granular filter materials 55 are tightly packed between first screen 45 and second screen 50, these stabilized "first ranks" of the granules in turn stabilize their immediately-adjacent, or "second", ranks of the granules; and this effect cascades throughout the entire depth of the interlocked mass of the granular filter materials. Thus, the mass of granular filter materials 55 are substantially fully stabilized, even though the first partial-depth, open-cell stabilizer 60 and second partial-depth, open-cell stabilizer 65 extend through only a portion of the full depth of the filter. Again, this is a significant improvement over the prior art.

Granular filter materials 55 serve to purge unwanted substances (e.g., toxins, biomolecules, etc.) from the air being filtered. The granular filter materials 55 typically have an irregular shape which is susceptible to shifting and settling, e.g., during shipping and handling of the filter. Granular filter materials 55 may comprise a single type of granule or they may comprise a blend of different types of granules. In essence, granular filter materials 55 may comprise any of the many granular filter materials well known in the art (e.g., activated carbon granules), so long as the granular filter materials are capable of purging the targeted substances from the air being filtered. It should be appreciated that the size of the openings within first screen and second screen are directly related to the size of the granules used.

Granular filter materials 55 are tightly packed between first screen 45 and second screen 50. In one preferred form of the invention, granular filter materials are packed under compression so as to enhance the interlocking nature of the granules. The degree of compression will depend upon a variety of factors, e.g., the size of the granules, the geometry of the granules, the hardness of the granules, the brittleness of the granules, the compressibility of the individual granules, the compressibility of the mass of granules, etc. In any case, the mass of the granular filter materials will be sufficiently tightly packed so as to ensure interlocking of the granules within the filter. This interlocking is important, inasmuch as it permits the first partial-depth, open-cell stabilizer 60 and second partial-depth, open-cell stabilizer 65 to stabilize the entire mass of the granular filter materials 55 without requiring that the stabilizers, 60, 65 extend across the entire depth of the filter.

In view of the foregoing construction, it will be appreciated that when air is passed through passageway 25 of filter 5, granular filter materials 55 will purge unwanted substances from the air. Furthermore, in view of the incorporation of first partial-depth, open-cell stabilizer 60 and second partial-depth, open-cell stabilizer 65 within filter 5, and the compression of the granular filter materials 55 between first screen 45 and second screen 50, the granular filter materials will be stabilized within the filter so as to reduce detrimental shifting and settling of the granular filter materials within the filter, whereby to minimize the creation of undesirable chimneys within the filter. At the same time, however, since open-cell stabilizers 60 and 65 collectively extend across only a portion of the full depth of the filter, the detrimental effects of wall chimneys will be minimized while still providing stability to the granular filter materials.

It should be appreciated that with the present invention, the height of the cell walls, and the number, size and cross-section of the open cells, are carefully coordinated with the nature of the granular filter materials, and the degree of compression of the granular filter materials, so as to achieve the best compromise between (i) increased wall chimney effects, and (ii) reduced granular filter material shifting and settling.

Thus it will be appreciated that, with the present invention, the (i) collective depths of first partial-depth, open-cell stabilizer 60 and second partial-depth, open-cell stabilizer 65, (ii) the number, size and cross-section of the open cells, (iii) the depth of the filter, (iv) the composition of the granular filter materials (e.g., the hardness of the granules, the brittleness of the granules, the compressibility of the individual granules, the compressibility of the collective mass of the granules, etc.), and (v) the magnitude of the compressive forces imposed on the mass of granular filter materials disposed between first screen 45 and second screen 50, are all carefully balanced vis-à-vis one another in order to provide the best possible stabilization for the granular filter materials without creating excessive wall chimney effects.

Additional Constructions

It should be appreciated that it is possible to have less than two partial-depth, open-cell stabilizers provided within frame 10. Thus, partial-depth, open-cell stabilizer 60 or partial-depth, open-cell stabilizer 65 may be omitted. However, the use of less than two partial-depth, open-cell stabilizers within frame 10 provides significantly less stabilization of the mass of granular filter materials 55. In addition, the use of less than two partial-depth, open-cell stabilizers provides significantly less stabilization to frame 10.

Figure 1:
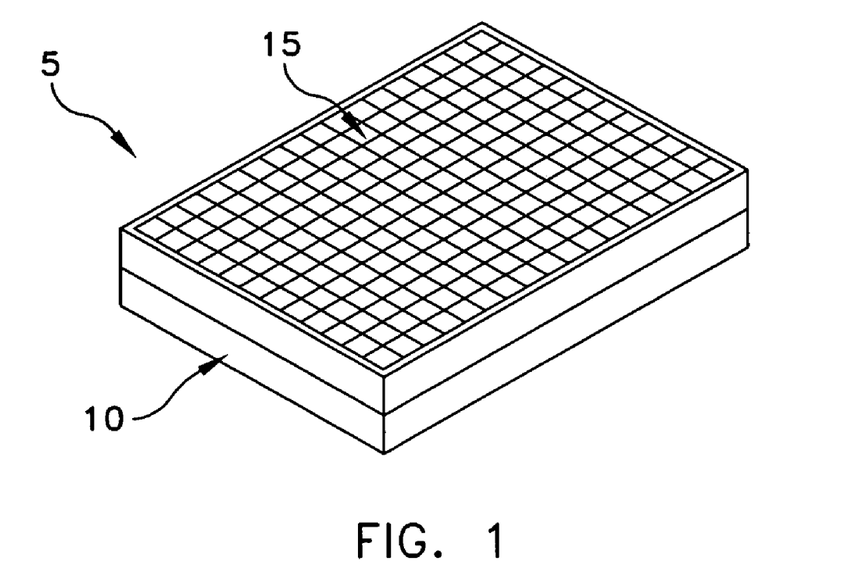
FIG. 1 is a schematic view showing a novel filter formed in accordance with the present invention.
Figures 2, 4, 5:
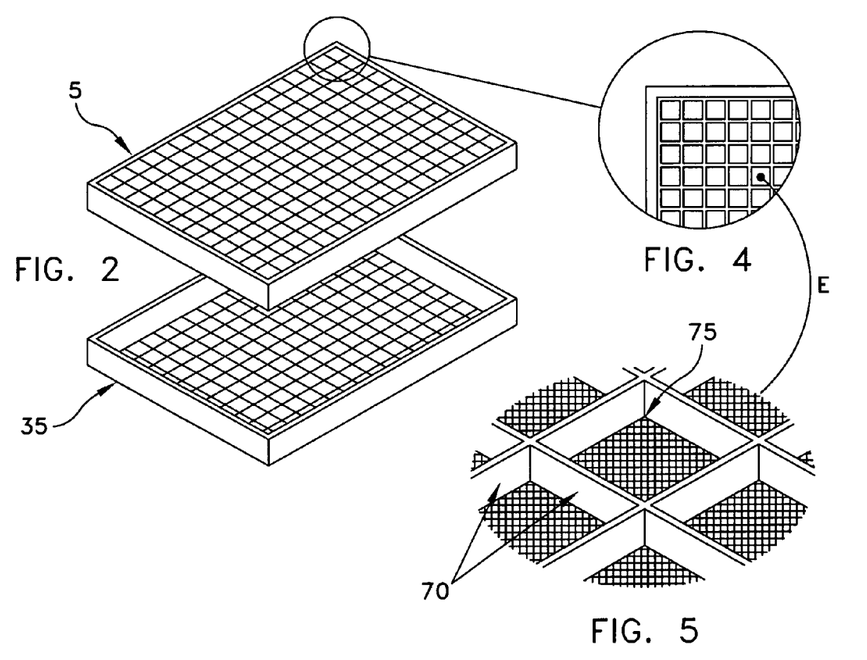
FIG. 2 is an exploded view of the filter shown in FIG. 1, with the two halves of the filter distanced from one another.
FIG. 4 is a plan view of a portion of the underside of the first screen shown in FIG. 2, showing the first partial-depth, open-cell stabilizer in greater detail.
FIG. 5 is an enlarged sectional view of the portion shown in FIG. 4, showing the first partial-depth, open-cell stabilizer formed as part of the first screen.
Figure 3:
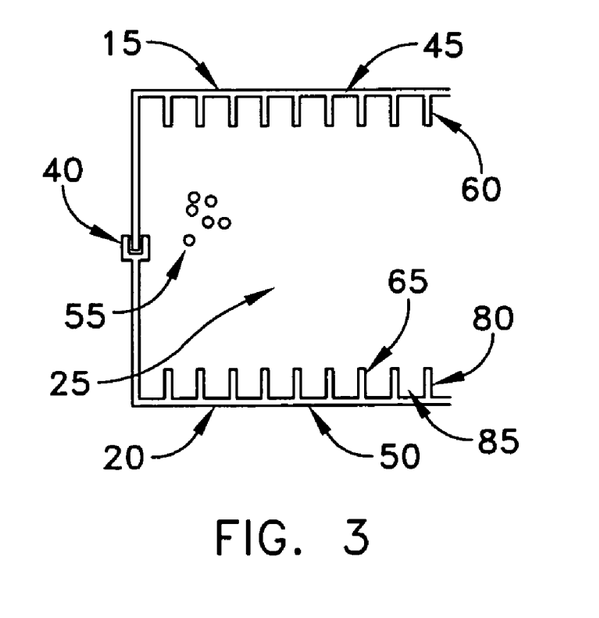
FIG. 3 is a schematic sectional view of the filter shown in FIG. 1, with a first partial-depth, open-cell stabilizer formed as part of the first screen and a second partial-depth, open-cell stabilizer formed as part of the second screen, in accordance with one preferred construction of the present invention.
Figure 3A:
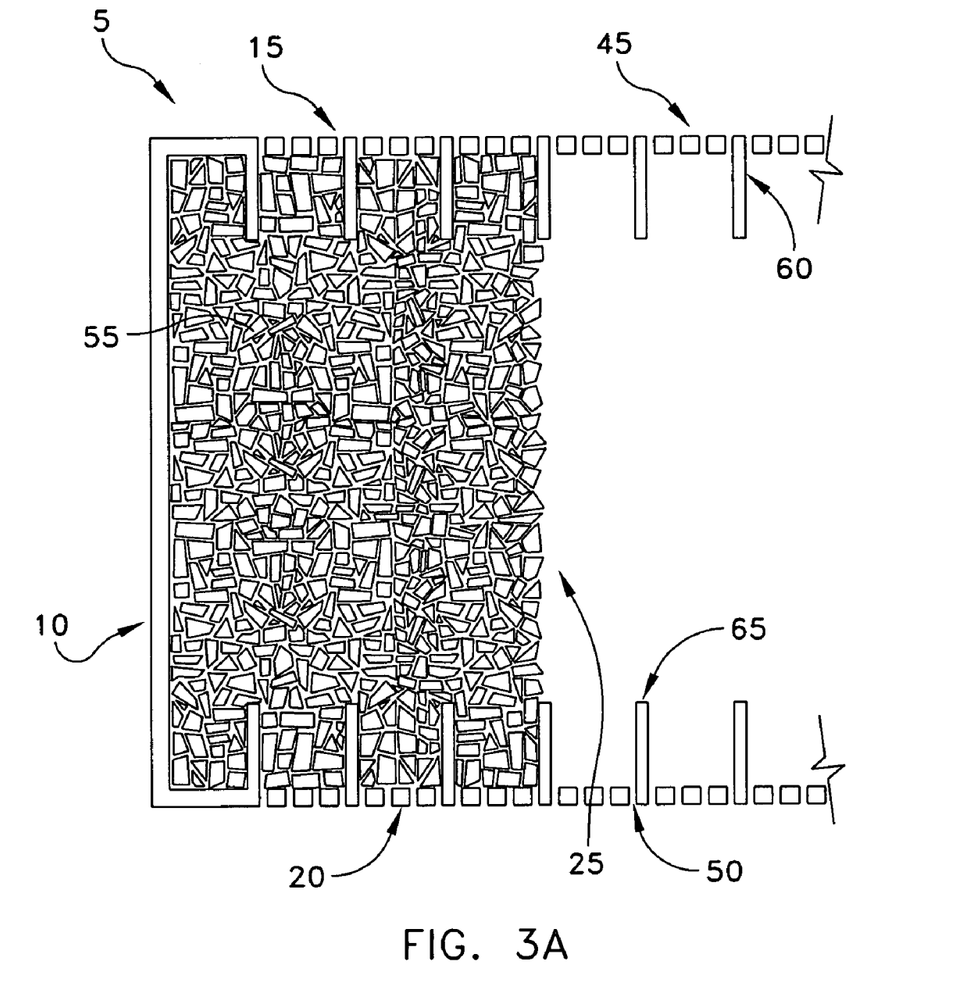
FIG. 3A is an enlarged cross-sectional view similar to that of FIG. 3, except emphasizing the interlocked nature of the compressed granular filter materials.
Figure 6A:
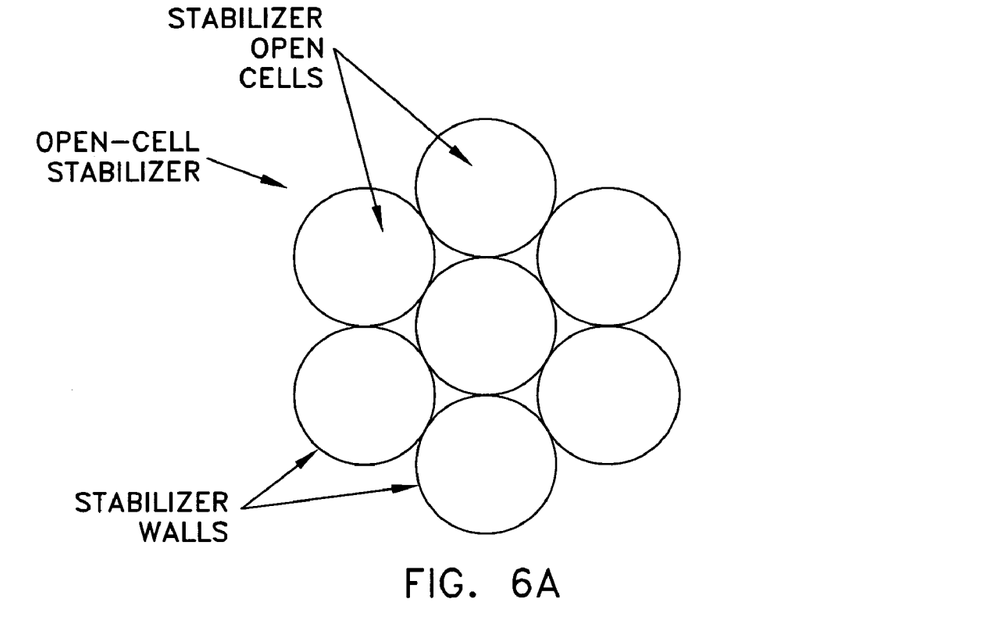
FIGS. 6A-6E show various additional open-cell constructions which may be used with the partial-depth, open-cell stabilizer of the present invention.
Figure 6B:
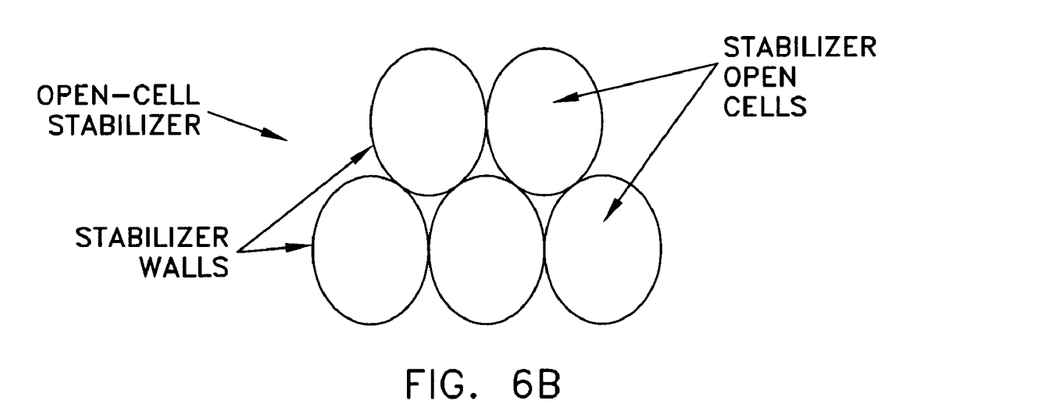
Figure 6C:
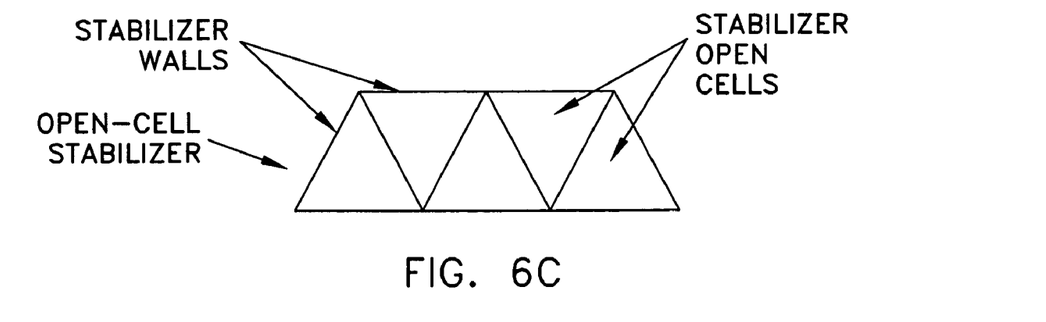
Figure 6D:
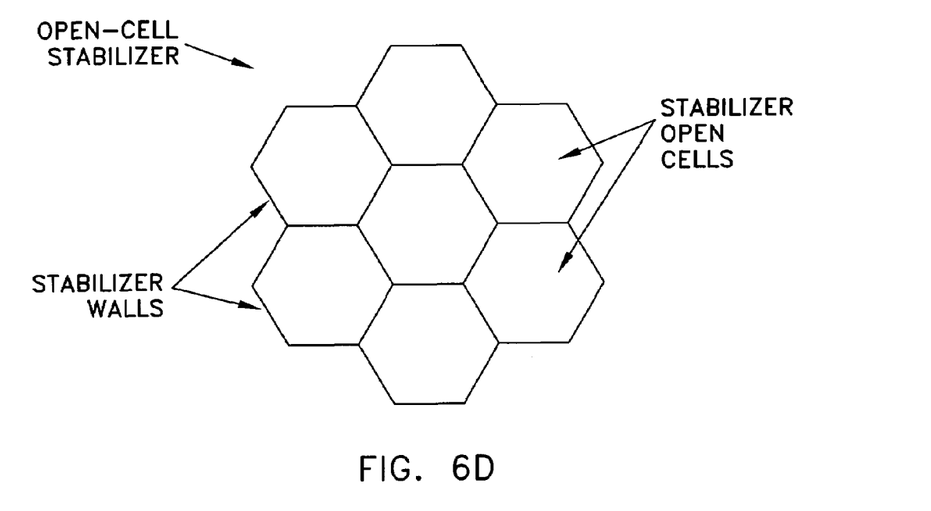
Figure 6E:
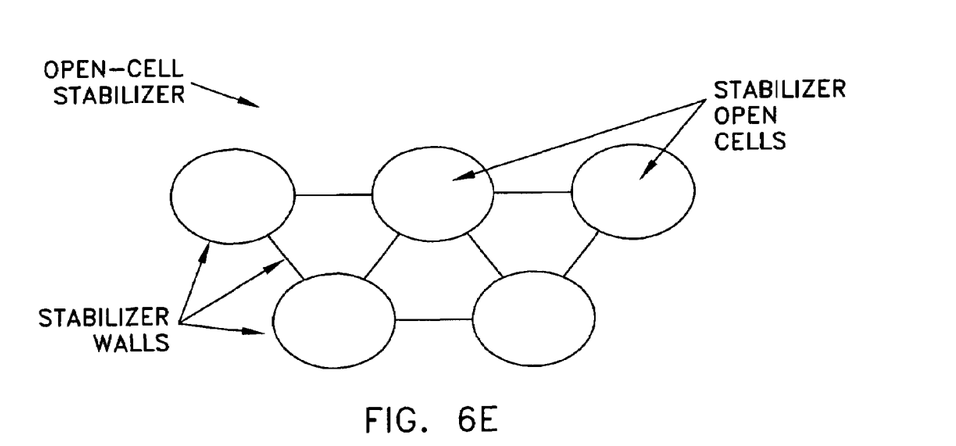

In the constructions shown in FIGS. 1-5, walls 70, 80 of the partial-depth, open-cell stabilizers 60, 65 are configured to provide identical, closely-packed open cells 75, 85 having a rectangular cross-section. However, the partial-depth, open-cell stabilizers may also be formed with open cells having different cross-sections, e.g., circular (FIG. 6A), oval or elliptical (FIG. 6B), triangular (FIG. 6C), or other polygonal (e.g., hexagonal, FIG. 6D) cross-sections. Alternatively, the open cells may be formed identical to one another, but spaced apart from one another (e.g., FIG. 6E).

In another form of the invention, the partial-depth, open-cell stabilizer(s) 60,65 may be formed out of open cells having a plurality of different cross-sections.

In another form of the invention, where two partial-depth, open-cell stabilizers are used in filter 5, each of the stabilizers may have an identical configuration. Alternatively, each partial-depth, open-cell stabilizer may have different configurations from one another.

Furthermore, it should be appreciated that the open cells of the partial-depth, open-cell stabilizer(s) may extend across the entire face, or only a portion of the entire face, of the screen(s). Again, however, providing open cells across less than substantially the entire face of the screen(s) provides significantly less stabilization of the mass of granular filter materials 55.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the present invention.

What is claimed is:

1. A filter comprising:
a hollow frame comprising a first face, a second face and an interior passageway extending therebetween;
a first screen extending across the passageway at the first face;
a first partial-depth, open-cell stabilizer extending across and into the passageway, wherein the stabilizer comprises a matrix formed by a plurality of walls defining a plurality of open cells therebetween,
a second screen extending across the passageway at the second face;
a second partial-depth, open-cell stabilizer extending across and into the passageway, wherein the stabilizer comprises a matrix formed by a plurality of walls defining a plurality of open cells therebetween; and
granular filter materials tightly packed within the passageway, between the first screen and the second screen;
wherein the distance between the first screen and the second screen defines the depth of the filter;
wherein the aggregate depth of the first partial-depth, open-cell stabilizer and the second partial-depth, open-cell stabilizer are collectively less than the depth of the filter; and
wherein the depths of the first and second partial-depth, open-cell stabilizers, the number, size and cross-section of their open cells, the depth of the filter, the composition of the granular filter materials, and the tightness of packing of the granular filter materials, are all balanced vis-à-vis one another in order to provide improved stabilization for the granular filter materials without creating excessive wall chimney effects.

2. A filter according to claim 1 wherein the first partial-depth, open-cell stabilizer is disposed adjacent to the first screen, and the second partial-depth, open-cell stabilizer is disposed adjacent to the second screen.

3. A filter according to claim 1 wherein the first screen is secured to at least one of the frame and the first partial-depth, open-cell stabilizer, and the second screen is secured to at least one of the frame and the second partial-depth, open-cell stabilizer.

4. A filter according to claim 1 wherein the first partial-depth, open-cell stabilizer is secured to at least one of the frame and the first screen, and the second partial-depth, open-cell stabilizer is secured to at least one of the frame and the second screen.

5. A filter according to claim 1 wherein the first partial-depth, open-cell stabilizer is formed integral with the first screen, and the second partial-depth, open-cell stabilizer is formed integral with the second screen.

6. A filter according to claim 1 wherein at least one of the first screen and the second screen is formed with a mesh structure.

7. A filter according to claim 1 wherein at least one of the first screen and the second screen is formed with a grill structure.

8. A filter according to claim 1 wherein the granular filter materials comprise activated carbon.

9. A filter according to claim 1 wherein at least one of the first partial-depth, open-cell stabilizer and the second partial-depth, open cell stabilizer comprise open cells having a rectangular cross-section.

10. A filter according to claim 1 wherein at least one of the first partial-depth, open-cell stabilizer and the second partial-depth, open cell stabilizer comprise open cells having a circular cross-section.

11. A filter according to claim 1 wherein at least one of the first partial-depth, open-cell stabilizer and the second partial-depth, open cell stabilizer comprise open cells having an oval-shaped cross-section.

12. A filter according to claim 1 wherein at least one of the first partial-depth, open-cell stabilizer and the second partial-depth, open cell stabilizer comprise open cells having a triangular cross-section.

13. A filter according to claim 1 wherein at least one of the first partial-depth, open-cell stabilizer and the second partial-depth, open cell stabilizer comprise open cells having a polygonal cross-section.

14. A filter according to claim 1 wherein the first partial-depth, open-cell stabilizer and the second partial-depth, open-cell stabilizer are identical to one another.

15. A filter according to claim 1 wherein at least one of the first partial-depth, open-cell stabilizer and the second partial-depth, open-cell stabilizer extends across approximately 5-30% of the depth of the filter.

16. A filter according to claim 1 wherein the open cells of at least one of the first partial-depth, open-cell stabilizer and the second partial-depth, open-cell stabilizer extend across the entire face of the screen.

17. A filter according to claim 1 wherein the open cells of at least one of the first partial-depth, open-cell stabilizer and the second partial-depth, open-cell stabilizer extend across only a portion of the entire face of the screen.

18. A filter according to claim 1 wherein the granular filter materials are tightly packed under compression between the first screen and the second screen.

19. A filter according to claim 1 wherein the hollow frame comprises a first half and a second half, and further wherein the first half of the frame, the first screen and the first partial-depth, open-cell stabilizer are all formed as a single unit, and the second half of the frame, the second screen and the second partial-depth, open-cell stabilizer are all formed as a single unit.

* * * * *